(12) United States Patent
Quinton et al.

(10) Patent No.: US 12,423,617 B2
(45) Date of Patent: Sep. 23, 2025

(54) SCALE SELECTIVE MACHINE LEARNING SYSTEM AND METHOD

(71) Applicant: Singulos Research Inc., Burnaby (CA)

(72) Inventors: Bradley Quinton, Vancouver (CA); Trent McClements, Burnaby (CA); Michael Scott Lee, North Vancouver (CA); Scott Chin, Vancouver (CA)

(73) Assignee: Singulos Research Inc., Burnaby (CA)

( * ) Notice: Subject to any disclaimer, the term of this patent is extended or adjusted under 35 U.S.C. 154(b) by 755 days.

(21) Appl. No.: 17/671,159

(22) Filed: Feb. 14, 2022

(65) Prior Publication Data

US 2022/0335334 A1 Oct. 20, 2022

Related U.S. Application Data

(60) Provisional application No. 63/176,762, filed on Apr. 19, 2021.

(51) Int. Cl.
*G06T 3/40* (2024.01)
*G06N 20/00* (2019.01)
*G06V 10/771* (2022.01)
*G06V 10/774* (2022.01)

(52) U.S. Cl.
CPC ........... *G06N 20/00* (2019.01); *G06T 3/40* (2013.01); *G06V 10/771* (2022.01); *G06V 10/774* (2022.01)

(58) Field of Classification Search
CPC .... G06N 20/00; G06V 10/771; G06V 10/774; G06T 3/40
See application file for complete search history.

(56) References Cited

U.S. PATENT DOCUMENTS

| 2015/0018671 A1* | 1/2015 | Marentis | A61B 6/12 600/424 |
| 2020/0202533 A1* | 6/2020 | Cohen | G06T 7/194 |
| 2022/0210467 A1* | 6/2022 | Chen | H04N 19/587 |

FOREIGN PATENT DOCUMENTS

| CN | 112163050 | * | 1/2021 | ............. G06F 16/23 |
| WO | WO-2011148562 A1 | * | 12/2011 | ....... G06F 17/30247 |

* cited by examiner

*Primary Examiner* — Sam Bhattacharya
(74) *Attorney, Agent, or Firm* — Borden Ladner Gervais LLP; Todd Keeler

(57) ABSTRACT

In an aspect, the present disclosure provides a method of generating scale selective training data for use in training a machine learning system to support scale selective image classification tasks, comprising obtaining a plurality of images comprising an object of interest at a plurality of image scales; assigning a desired label to each of the plurality of images based on an image scale of the object of interest in the each image, wherein the desired label comprises an in-scope response when the image scale comprises an in-scope image scale, and generating a set of training data for use in training the machine learning system to predict a scale of the object of interest, the training data comprising the plurality of images and corresponding desired labels.

12 Claims, 8 Drawing Sheets

SCALE SELECTIVE MACHINE LEARNING SYSTEM AND METHOD

CROSS REFERENCE

This application claims the benefit of priority of U.S. Provisional Patent Application No. 63/176,762, filed on Apr. 19, 2021, and entitled SYSTEM AND METHOD FOR CREATING SCALE SELECTIVE MACHINE LEARNING ARCHITECTURES, the entirety of which is incorporated herein by reference.

FIELD

The present disclosure relates generally to machine learning systems, and more particularly to scale selective machine learning systems and even more particularly to scale selective training processes for machine learning systems to support scale selective image classification tasks.

BACKGROUND

Machine Learning Systems generally, are systems that can be trained to process and analyze specific data sets to produce a decision or judgement, or to generate new data. Machine Learning Systems are trained using a Training Process. A Training Process generally includes the process in which, using various search and optimization processes (e.g., backpropagation), the Parameters of the Machine Learning System are iteratively adjusted based the evaluation of a Cost Function. In other words, the Training Process is the process of finding a set of Parameters for a given Machine Learning System that achieve a prediction goal of the system.

In some cases, the Training Process proceeds iteratively with the Parameters being updated and the Cost Function evaluated until the training Cost (e.g., a measurement of deviation of one or more a given Predictions from one or more Labels; the Cost is calculated by the Cost Function) goal is achieved, the maximum number of allowed iterations have completed, or some other condition or constraint is met. Parameters include the internal states of the Machine Learning System that are changed during the Training Process and recorded for use when the Machine Learning System is tested or used in a Deployed Scenario when the trained, and optionally tested, Machine Learning Systems can be used to generate Predicted Labels (e.g., the Label generated by the Machine Learning System for given Input Data) for never-before-seen Input Data. Often this Input Data is supplied by another higher-level system and the Predicted Labels are passed back to the higher-level system.

Cost Functions generally measure the accuracy of a given Prediction (e.g., the process of generating a Predicted Label) versus a Label (e.g., examples of desired outputs of a Machine Learning System). During the Training Process, the Cost Function acts as a proxy to results of the Prediction Engine (e.g., the portion of the Machine Learning System that processes the output of the Machine Learning Engine to predict the Label), in the sense that lowering the Cost, should lead to more accurate Predictions from the Prediction Engine, (however, this is not strictly true, and it is possible that lowering the Cost according to the Cost Function does not improve the accuracy of the Predicted Labels). The Cost Function result is used to update the Parameters of the Machine Learning Engine with the goal of finding a set of Parameters which lowers the Cost. This can be done with a number of search and optimization methods including backpropagation, etc.

The Machine Learning Engine generally includes the portion of the Machine Learning System that is trained during the Training Process. The output of the Machine Learning Engine is processed by the Prediction Engine to predict the Label. Machine Learning Engine and the Prediction Engine define the complete processing capabilities of the system and can be used to deterministically generate a Predicted Label from any given Input Data. There are many ways to implement a Machine Learning System, including using an artificial neural network, recurrent neural networks, convolutional neural networks, logistic regression, support vector machines, etc. These Machine Learning Systems are used for a large variety of applications including Image Classification, object detection, Dynamic Object Comprehension, etc.

A common task for Machine Learning Systems is processing Image Data, a type of Input Data created by projecting a signal onto one or more physical surfaces or sensors. The signal source may be one of many types including but not limited to visible light, electromagnetic radiation (infrared, thermal), sonar, RADAR, LiDAR, electron microscope or others. Image Data contains spatial features that can be organized in representations in two-dimensional, or higher-dimensional, space. Input Data may include one or more data elements applied to a Machine Learning System. Specific examples of Input Data are Image Data, audio data, GPS co-ordinates, purchasing habits, personal data, etc.

Some examples of Image Data processing tasks are Image Classification, object detection and Dynamic Object Comprehension. Image Classification generally includes the Classification problem for when the input is Image Data. For example, given Image Data, the system predicts to which class the image belongs. In practice, a system designed to perform Image Classification supports a finite set of classes. A class may represent a specific type of object, or a more abstract concept such as an Out-Of-Scope (e.g., a class in a classification system that represents an input that does not belong to another class supported by the classification system). Dynamic Object Comprehension generally includes simultaneous, real-time, identification, localization and tracking of one or many Objects of Interest across one or many object classes. Thereby enabling real-time interaction between physical and virtual worlds and unlocking next generation applications ranging from augmented reality/mixed reality and robotics to on-line advertising and retail experiences. An Object of Interest generally includes an object that is the subject of processing or analysis to increase the systems understanding of some aspect of the object. This processing may be done with Machine Learning Systems or other systems capable of processing Image Data. Specific examples of an Object of Interest include a LEGO™ brick, a chess piece, dye, figurine, etc.

It remains desirable therefore, to develop further improvements and advancements in relation to Machine Learning Systems, including but not limited to improving Machine Learning Systems, for example, improving a Training Process or operation in relation to Image Classification, object detection and Dynamic Object Comprehension for Image Data (and other Input Data), and to overcome shortcomings of known techniques, and to provide additional advantages thereto.

This section is intended to introduce various aspects of the art, which may be associated with the present disclosure.

This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments of the present disclosure will now be described, by way of example only, with reference to the attached Figures.

Figure 1:
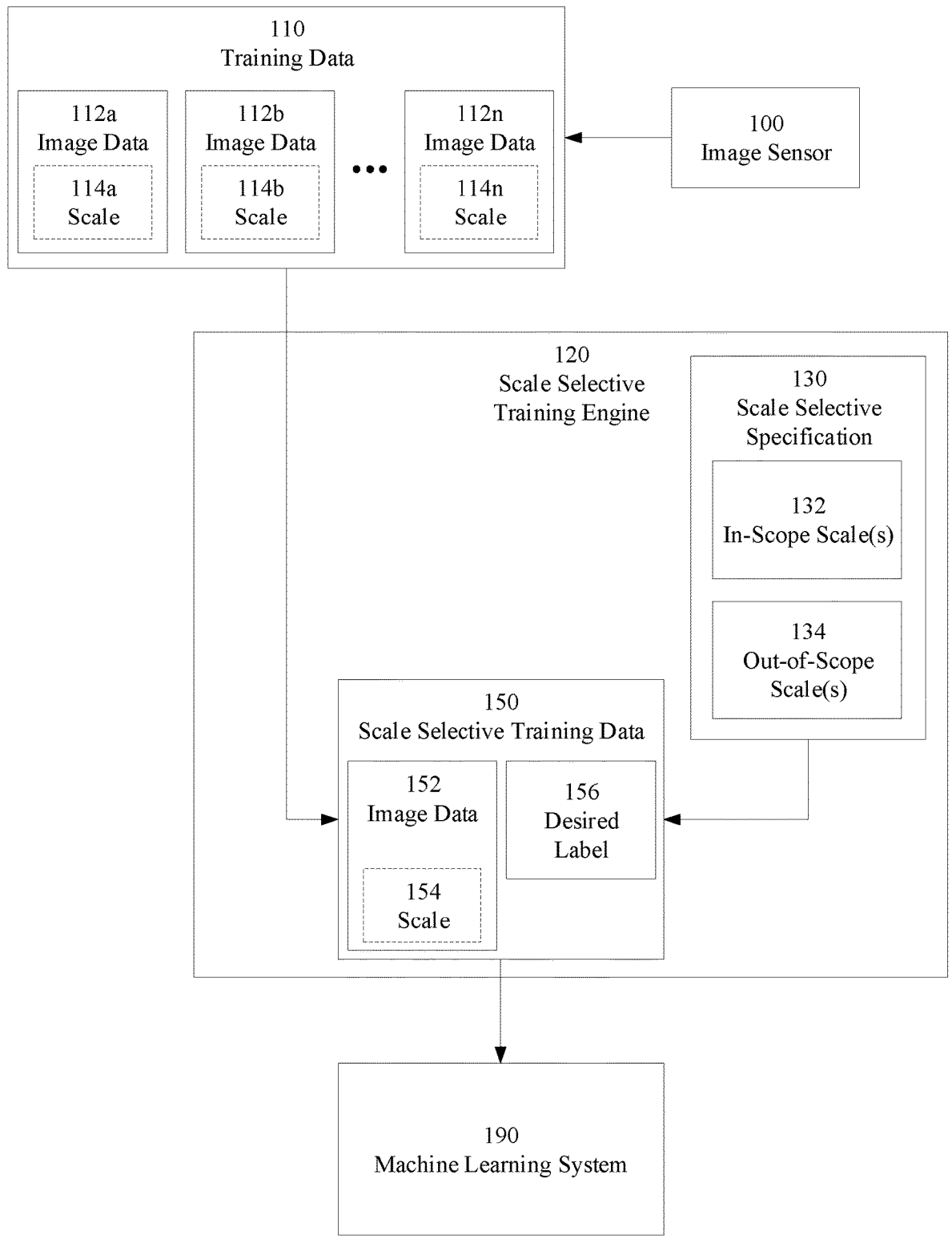
FIG. 1 is a block diagram of a system for generating Scale Selective Training Data in accordance with an embodiment of the present disclosure, for use in training a Machine Learning System to support Scale Selective Image Classification Tasks.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompasses by the corresponding description.

DETAILED DESCRIPTION

The following are examples of systems and methods for Scale Selective Machine Learning Systems and methods in accordance with the present disclosure.

According to an aspect, the present disclosure provides a method of generating scale selective training data for use in training a machine learning system to support scale selective image classification tasks, comprising: obtaining a plurality of images comprising an object of interest at a plurality of image scales; assigning a desired label to each of the plurality of images based on an image scale of the object of interest in the each image, wherein the desired label comprises an in-scope response when the image scale comprises an in-scope image scale, and generating a set of training data for use in training the machine learning system to predict a scale of the object of interest, the training data comprising the plurality of images and corresponding desired labels.

In an example embodiment, the desired label comprises an out-of-scope response when the image scale comprises an out-of-scope image scale.

In an example embodiment, obtaining the plurality of images comprises use of an image sensor to capture the object of interest at different image scales based on varying a distance between the image sensor and the object of interest.

In an example embodiment, obtaining the plurality of images comprises: obtaining a first plurality of images of the object of interest at first image scales, and generating a second plurality of images based on re-scaling the first plurality of images to second image scales.

In an example embodiment, the first plurality of images comprise a first image of the object of interest at a maximum image scale, wherein generating the second plurality of images comprises down-sampling the first image.

In an example embodiment, obtaining the plurality of images comprises: generating a third plurality of images based on re-scaling the second plurality of images to third image scales.

In an example embodiment, the plurality of image data comprises the set of training data generated for use in training the machine learning system.

In an example embodiment, generating the scale selective training data further comprises generating the set of training data directly to the machine learning system contemporaneously with its generation.

According to an aspect, the present disclosure provides a method of generating a prediction in a scale selective machine learning system, comprising: receiving an input comprising image data of an object; determining a scale of the object, and generating a prediction for the object based on the scale of the object.

In an example embodiment, the prediction comprises a label, the method further comprising selecting the label from a set of labels comprising an in-scope label and an out-of-scope label.

In an example embodiment, generating a prediction further comprises selecting the in-scope label when the scale of the object comprises an in-scope scale.

In an example embodiment, the in-scope scale comprises a continuous range of in-scope scales.

In an example embodiment, the in-scope scale comprises a discrete in-scope scale.

In an example embodiment, generating a prediction further comprises determining a class of the object; wherein generating the prediction for the object is further based on the class of the object.

In an example embodiment, generating a prediction further comprises selecting the in-scope label when a scale of the object comprises an in-scope scale and a class of the object comprises an in-scope class.

In an example embodiment, generating a prediction further comprises selecting the out-of-scope label when at least one of a scale of the object does not comprise an in-scope scale or a class of the object does not comprise an in-scope class.

According to an aspect, the present disclosure provides a method of implementing scale selective image classifications for an object of interest, comprising: receiving an input image comprising the object of interest at an input image scale; scaling the input image to generate a variant image comprising the object of interest at a variant image scale; providing the variant image as an input to a plurality of machine learning systems configured to provide a corresponding plurality of predictions, each trained to output a prediction based on identifying the object of interest at a respective trained image scale, and generating a scale selective prediction for the object of interest based on the corresponding plurality of predictions.

In an example embodiment, the prediction of a respective machine learning system of the plurality of machine learning systems comprises an in-scope prediction when the variant image scale matches the trained image scale of the respective machine learning system.

In an example embodiment, scaling the input image comprises: upscaling the input image to generate an up-scaled image comprising the object of interest at an up-scale image scale, and downscaling the input image to generate a down-scaled image comprising the object of interest at a down-scale image scale; wherein the scaled image comprises the up-scaled image and the down-scaled image.

In an Image Classification task, an Object of Interest may appear in Image Data at different Image Scales (e.g., a spatial size of an object or Object of Interest within Image Data) depending the Object of Interest's location relative to an image sensor used to obtain the Image Data. Consider for example capturing images of a chess piece using a digital camera. The digital camera may capture a first image of the chess piece from a first location and a second image of the chess piece from a second location. Each of the first image and second image will comprise Image Data of the chess piece at respective first and second Image Scales based on a distance between the chess piece and the digital camera. Thus for example, if the first location is closer to the chess piece relative the second location, the first image may comprise Image Data of the chess piece at a first Image Scale greater than a second Image Scale of the second image. However, Scale Invariant Image Classification Machine Learning Systems consider Image Data for an Object-of-Interest to be equivalent, regardless of the Image Scale. In other words, a Scale Invariant Machine Learning Systems is trained to predict that an Object of Interest is In-Scope (e.g., a state of being part of a set of known classes for a given classification task) regardless of the Image Scale of the Object of Interest. Scale Invariant Machine Learning Systems provide limited ability to support Dynamic Object Comprehension or otherwise classify objects on the basis of scale. In contrast, systems and methods for a Scale Selective Machine Learning System, as disclosed herein include making predictions on the basis of scale which may be leveraged to enable Dimensionally-Aware Machine Learning Systems and Neural Networks. Advantageously, Scale Selective Machine Learning Systems may for example, lead to simpler optimization problems during a Training Process or provide greater efficiency in Deployment Scenarios (e.g., when a trained Machine Learning Systems is used to generate predictions for new Input Data). In one aspect, the present disclosure provides systems and method for creating Scale Selective Machine Learning Systems, including embodiments of a Scale Selective Training Process, Scale Selective Machine Learning System Architectures, and Scale Selective Prediction Engines.

FIG. 1 illustrates a block diagram of an embodiment of a Scale Selective Training Engine for use in a Training Process for training a Machine Learning System to support Scale Selective Image Classification Tasks. In particular, FIG. 1 depicts an image sensor 100, Training Data 110, Scale Selective Training Engine 120, Scale Selective Specification 130, Scale Selective Training Data 150, and a Machine Learning System 190. The image sensor 100 generates a set of Training Data 110 comprising a plurality of elements of Training Data, each element comprising Image Data 112a, 112b, . . . , 112n of an object, such as an Object of Interest, at a corresponding Image Scale 114a, 114b, . . . , 114n, respectively. The image sensor 100 obtains the Training Data 110 by capturing images of the Object of Interest from different distances, producing Image Data of the Object of Interest at a variety of different Image Scales, for use in training the Machine Learning System 190 to output a Prediction (e.g., outputting a Predicted Label for a given Input Data) based on a scale of the Object of Interest. In an embodiment, the Machine Learning System 190 may be trained to output a bounding-box Prediction for an Object of Interest and infer an Image Scale of the Object of Interest based on the predicted bounding-box. In an embodiment, the image sensor 100 comprises a camera. In an embodiment, the image sensor 100 comprises a digital camera, such as a digital camera that may be embedded in an electronic device, such as a smart phone, tablet, or laptop. The Training Data 110 may be stored on a memory communicatively coupled to the image sensor 100, may be stored remotely for access-on-demand, such as being stored in the cloud, or may be provided in real time to the Scale Selective Training Engine 120, on the fly with its creation, and may be discarded after the Scale Selective Training Engine 120 has processed it.

FIG. 1 further illustrates an embodiment of a Scale Selective Training Engine 120 for generating Scale Selective Training Data 150 based on the Training Data 110 and a Scale Selective Specification 130. The Scale Selective Training Engine 120 receives an element of Training Data 110 (e.g., an image comprising Image Data at a corresponding Image Scale) and assigns a Desired Label 156 to the element of Training Data based on an Image Scale of the element of Training Data and the Scale Selective Specification 130, to generate an element of Scale Selective Training Data 150. In an embodiment, the Image Scale 154 comprises a value relative to a known size of the Object of Interest. In an embodiment, the Scale Selective Specification 130 may comprise a set of In-Scope Scales 132 and a set of Out-of-Scope Scale 134. An In-Scope Scale may comprise an Object of Interest appearing within Image Data at a particular Image Scale such that when provided as an input to a Machine Learning System, the resulting Prediction of the Machine Learning System will comprise an In-Scope Prediction. Conversely, an Out-of-Scope Scale may comprise an Object of Interest appearing within Image Data at a particular Image Scale such that when provided as an input to a Machine Learning System, the resulting Prediction of the Machine Learning System will comprise an Out-of-Scope Prediction. In an embodiment, the In-Scope Scales 132 may comprise a single discrete value. In an embodiment, the In-Scope Scales 132 may comprise a continuous range of Image Scales. In an embodiment, the In-Scope Scales 132 may comprise a plurality of discontinuous ranges of Image Scales. Similarly, embodiments of a set of Out-of-Scope scales may comprise one or more continuous ranges of Out-of-Scope Scales. For example, a Scale Selective Specification 130 may define a set of In-Scope Scales and Out-of-Scope Scales for a feature of an Object of Interest, such as the width of a stud located on a LEGO™ block. For example, the Scale Selective Specification 130 may define a set of Image Scales: 9 pixels/stud, 10 pixels/stud, 11 pixels/stud, 12 pixels/stud, 13 pixels/stud, 14 pixels/ stud, and 15 pixels/stud, and further define a set of In-Scope Scales comprising the Image Scales 11 pixels/stud, 12 pixels/stud, and 13 pixels/stud. The remaining Image Scales define the set of Out-of-Scope Scales. Other undefined Image Scales may simply train a Machine Learning System to illicit a don't care response. The result of this Scale Selective Specification is such that, a Scale Selective Machine Learning System will be trained to output In-Scope Predictions in response to receiving an input Image Data comprising a LEGO™ block having a stud at an In-Scope Image Scale of 11, 12, or 13 pixels/stud.

As an example of generating an element of Scale Selective Training Data, the Scale Selective Training Engine 120 may receive a first element of Training Data comprising first Image Data 112a of an Object of Interest at a first Image Scale 114a. The Scale Selective Training Engine generates an element of Scale Selective Training Data 150 comprising Image Data 152 and an Image Scale 154 for the received element of Training Data; wherein the Image Data 152 and Image Scale 154 comprise the first Image Data 112a and the First Image Scale 114a, respectively. The Scale Selective Training Engine 120 determines a Desired Label 156 for the Image Data 152 based on the Image Scale 154 and a Scale Selective Specification 130. For example, the Desired Label 156 may be assigned an In-Scope label when the Image Scale 154 comprise an In-Scope Scale 132; or, may be assigned an Out-of-Scope label when the Image Scale 154 comprises an Out-of-Scope Scale 134. Embodiments of a Scale Selective Training Engine may assign a Desired Label 156 based on a plurality of criteria, including but not limited-to, whether the Image Data 152 comprises an Object of Interest, and based on an Image Scale of the Object of Interest. The Image Data 152, Image Scale 154, and Desired Label 156 comprise an element of Scale Selective Training Data for use in training a Machine Learning System to support Scale Selective Image Classification Tasks. The process of generating a single element of Scale Selective Training Data 150 may be repeated for all elements of Training Data in the set of Training Data 110, to generate a set of Scale Selective Training Data. Embodiments as disclosed herein include providing the Scale Selective Training Data to a Machine Learning System, in real-time, during a Training Process of the Machine Learning System, advantageously removing the need to first store the Scale Selective Training Data prior to its input to the Machine Learning System. In an embodiment, a set of Scale Selective Training Data is generated and stored offline a priori to a Training Process for a Machine Learning System.

Figure 2:
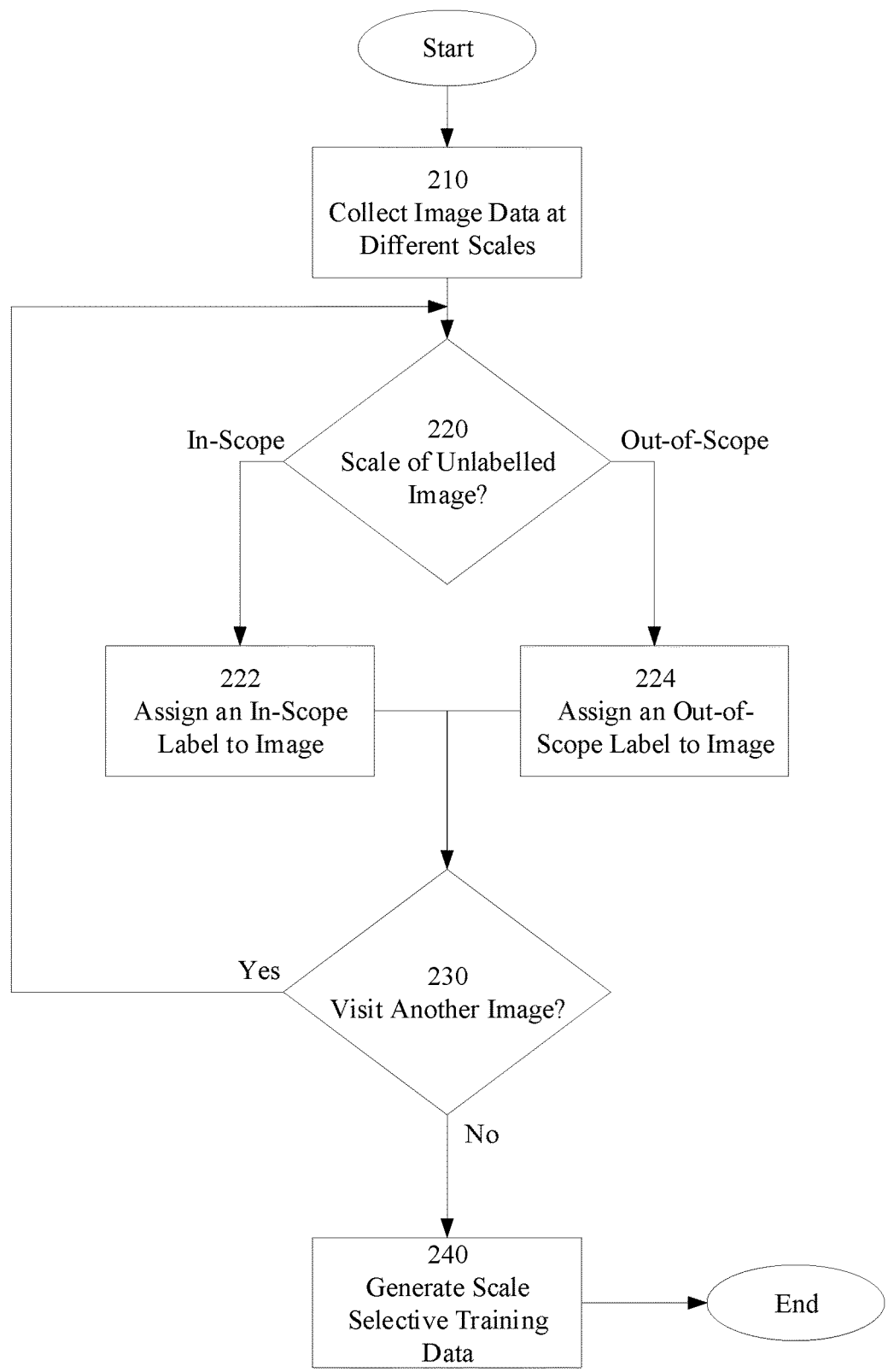
FIG. 2 is a flow chart of a method for generating Scale Selective Training Data in accordance with an embodiment of the present disclosure, for use in training a Machine Learning System to support Scale Selective Image Classification Tasks.

FIG. 2 illustrates a method 200 for generating Scale Selective Training Data in accordance with an embodiment of the present disclosure. The operation of method 200 is not intended to be limiting but rather illustrates an example of generating Scale Selective Training data for use in a Training Process for a Machine Learning System. In some embodiments, method 200 may be accomplished with one or more additional operations not described, and/or without one or more of the operations described. Similarly, the order in which the operation of method 200 is illustrated and described below is not intended to be limiting, but rather illustrative of an example of generating Scale Selective Training Data in accordance with an embodiment of the present disclosure.

In some embodiments, the method 200 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the method 200 in response to instructions stored electronically on an electronic storage medium. The one or more processing devices may include one or more devices configured through hardware, firmware, and/or software to be specifically designed for execution of one or more of the operations of the method 200.

The method 200 may include an operation 210 for collecting a set of Training Data comprising a plurality of images, each image comprising Image Data of an Object of Interest at an Image Scale of the Object of Interest. In an embodiment, the operation 210 may comprise using an image sensor to generate Image Data of an Object of Interest at different Image Scales based on varying a distance between the Image Sensor and the Object of Interest. In an embodiment, the operation 210 may retrieve a set of previously generated Training Data from a storage medium, wherein the Training Data comprises a plurality of Image Data of an Object of Interest at a variety of Image Scales. The Training Data collected by the operation 210 serves as a basis for generating a set of Scale Selective Training Data.

The method 200 may include an operation 220 for determining the Image Scale of an Object of Interest. For example, the operation 220 may determine whether an element of Training Data (e.g., an image) comprises Image Data of an Object of Interest at a particular Image Scale. For example, the operation 220 may comprise determining whether the Image Scale of the Object of Interest is an In-Scope Scale or an Out-of-Scope Scale. In an embodiment, a Scale Selective Specification may define a set of scales and corresponding labels for use in determining a Desired Label for the Image Data. In an embodiment, the Scale Selective Specification comprises a set of In-Scope Scales and a set of Out-of-Scope Scales.

The method 200 may proceed to a further operation based on the outcome of the operation 220. For example, if the outcome of the operation 220 is an In-Scope determination, the method 200 may proceed to an operation 222 to assign an In-Scope Label to the Image Data; or for example, if the outcome of the operation 220 is an Out-of-Scope determination, then the method 200 may proceed to an operation 224 to assign an Out-of-Scope label to the Image Data. The outcome of either operations 222 or 224 is an element of Scale Selective Training Data comprising Image Data at a particular Image Scale and a corresponding Desired Label based on the Image Scale.

The method 200 may include an operation 230 for visiting a further image of the set of Training Data, and repeating operations of the method 200 to assign a Desired Label to the corresponding Image and Image Data. Accordingly, operations in accordance with the method 200 may be repeated as necessary to generate a plurality of Scale Selective Training Data elements. In the event there is no need to visit further images or no further images to visit, the method 200 may advance to an operation 240 to collate some or all elements of Scale Selective Training Data into a set of Scale Selective Training Data, for use in training a Machine Learning System to support Scale Selective Image Classification tasks.

Figure 3:
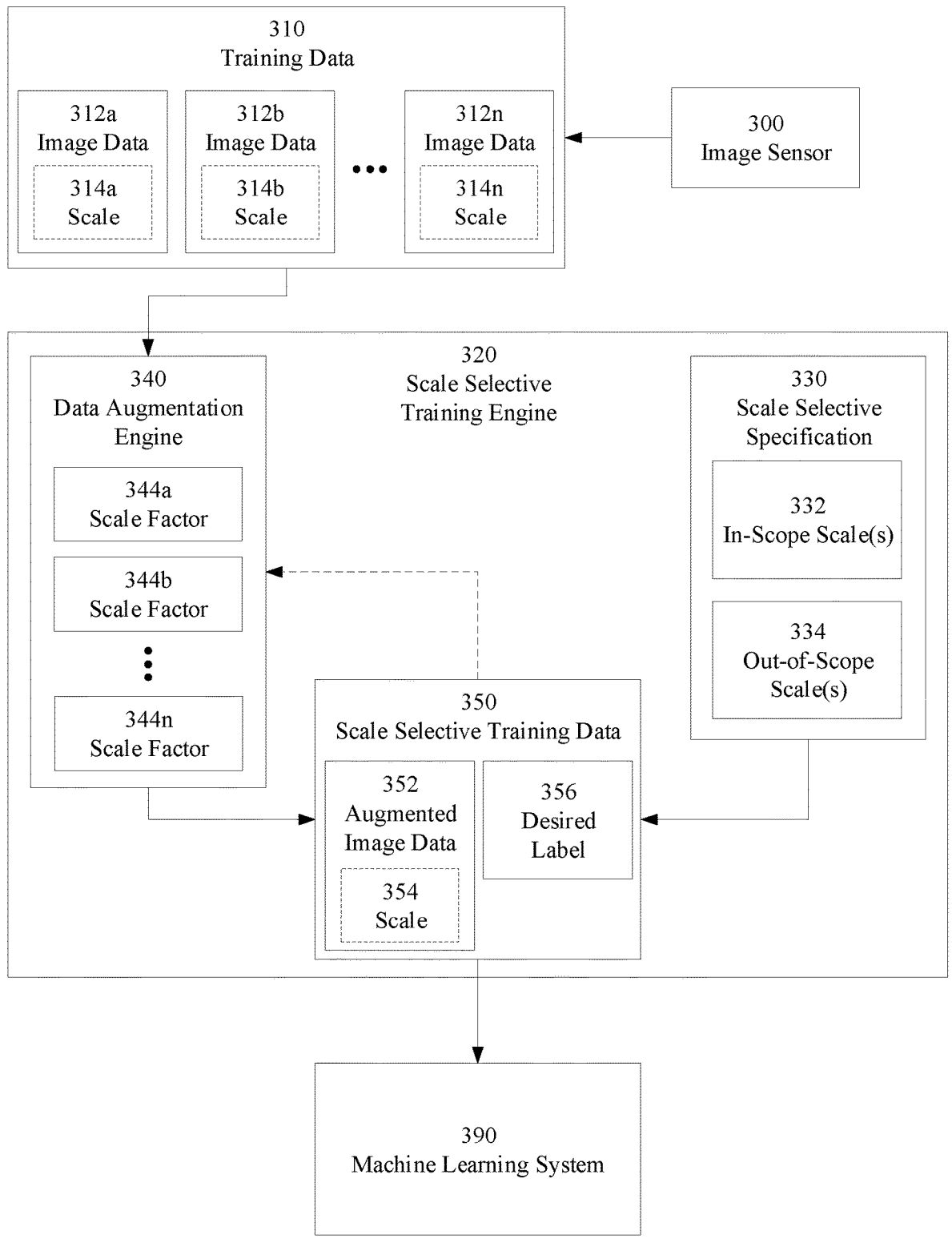
FIG. 3 is a block diagram for generating Scale Selective Training Data using Data Augmentations in accordance with an embodiment of the present disclosure, for use in training a Machine Learning System to support Scale Selective Image Classification Tasks.

FIG. 3 illustrates a block diagram of an embodiment of a Scale Selective Training Engine for use in a Training Process for training a Machine Learning System to support Scale Selective Image Classification Tasks. In particular, FIG. 3 depicts an image sensor 300, Training Data 310, Scale Selective Training Engine 320, Scale Selective Specification 330, Data Augmentation Engine 340, Scale Selective Training Data 350, and a Machine Learning System 390. The image sensor 300 generates a set of Training Data 310 comprising a plurality of elements of Training Data, each element comprising Image Data 312a, 312b, . . . , 312n of an object, such as an Object of Interest, at a corresponding Image Scale 314a, 314b, . . . , 314n, respectively. The image sensor 300 obtains the Training Data 310 by capturing images of the Object of Interest from different distances, producing Image Data of the Object of Interest at a variety of different Image Scales, for use in training the Machine Learning System 390 to output a Prediction based on a scale of the Object of Interest. In an embodiment, the Machine Learning System 390 may be trained to output a bounding-box Prediction for an Object of Interest and infer an Image Scale of the Object of Interest based on the predicted bounding-box. In an embodiment, the set of Training Data 310 may comprise a plurality of Image Data at the same or similar Image Scales and may be subject to subsequent augmentation via the Data Augmentation Engine 340, for producing Augmented Data comprising an Object of Interest at an Augmented Image Scale. In this regard, the Data Augmentation Engine 340 may be leveraged to increase or decrease a size of the image, thereby providing the Image Data at a different Image Scale. For example, when the set of Training Data lacks a variety of Image Data or a variety of Image Scales it may be desirable to augment the elements of the Training Data to provide a more robust set of Training Data having Image Data at a greater variety of Image Scales. In an embodiment, the set of Training Data may comprise Image Data of an Object of Interest collected at a maximum desired Image Scale. In such an embodiment, the Data Augmentation Engine 340 may resize Image Data based on down-sampling only, advantageously eliminating the need to up-sample and create new data when upscaling a size of Image Data, thereby improving computational efficiencies in creating Scale Selective Training Data.

In an embodiment, the image sensor 300 comprises a camera. In an embodiment, the image sensor 300 comprises a digital camera, such as a digital camera that may be embedded in an electronic device, such as a smart phone, tablet, or laptop. The Training Data 310 may be stored on a memory communicatively coupled to the image sensor 300, may be stored remotely for access-on-demand, such as being stored in the cloud, or may be provided in real time to the Scale Selective Training Engine 320, on the fly with its creation, and may be discarded after the Scale Selective Training Engine 320 has processed it.

FIG. 3 further illustrates an embodiment of a Scale Selective Training Engine 320 for generating Scale Selective Training Data 350. The Scale Selective Training Engine 320 comprises the same features as the Scale Selective Training Engine 120 illustrated in FIG. 1, and further comprises a Data Augmentation Engine 340 for applying Data Augmentations (e.g., modified copies of data. For example: spatially translating Image Data, and other translation functions including but not limited to: rotation, zoom, different background, random noise injection, mirroring, color adjustment). The Scale Selective Training Engine 320 generates Scale Selective Training Data 350 based on generating Augmented Image Data 352 having an Augmented Image Scale 354, and assigns a Desired Label 356 to the Scale Selective Training Data 350 based on the Augmented Image Scale 354 and a Scale Selective Specification 330. In an embodiment, the Data Augmentation Engine 340 augments Image Data based on applying a random Image Scaling Factor, thereby resizing the Image Data based on the Image Scaling Factor. In an embodiment, the Data Augmentation Engine 340 comprises a plurality of Image Scaling Factors bounded by a maximum Image Scaling Factor and a minimum Image Scaling Factor selected to limit resizing Image Data between a desired maximum and minimum size. In an embodiment the Data Augmentation Engine 340 applies a random Image Scaling Factor selected from a plurality of Image Scaling Factors. In an embodiment, the Augmented Image Scale 354 comprises a value relative to a known size of the Object of Interest. In an embodiment, the Data Augmentation Engine 340 may re-scale Image Data based on a re-scaling algorithm including, but not limited to: nearest-neighbour interpolation, bilinear interpolation, bicubic interpolation, and/or use of a Machine Learning System configured to rescale Image Data.

In an embodiment, the Scale Selective Specification 330 may comprise a set of In-Scope Scales 332 and a set of Out-of-Scope Scale 334. An In-Scope Scale may comprise an Object of Interest appearing within Image Data at a particular Image Scale such that when provided as an input to a Machine Learning System, the resulting Prediction of the Machine Learning System will comprise an In-Scope Prediction. Conversely, an Out-of-Scope Scale may comprise an Object of Interest appearing within Image Data at a particular Image Scale such that when provided as an input to a Machine Learning System, the resulting Prediction of the Machine Learning System will comprise an Out-of-Scope Prediction. In an embodiment, the In-Scope Scales 332 may comprise a single discrete value. In an embodiment, the In-Scope Scales 332 may comprise a continuous range of Image Scales. In an embodiment, the In-Scope Scales 332 may comprise a plurality of discontinuous ranges of Image Scales.

As an example of generating an element of Scale Selective Training Data, the Scale Selective Training Engine 320 may receive a first element of Training Data comprising first Image Data 312a of an Object of Interest at a first Image Scale 314a. The Scale Selective Training Engine then generates an element of Scale Selective Training Data 350 based on applying a Data Augmentation to the first Image Data 312a. For example, the Data Augmentation Engine 340 may apply an augmentation to the first Image Data 312a. For example, the Data Augmentation Engine 340 may apply a first image scale factor 344a, a second image scale factor 342b, . . . , or a $n^{th}$ image scale factor 344a to the first Image Data 312a, generating Augmented Image Data 352, resized based on the image scale factor applied and having a resulting Augmented Image Scale 354. The process may be repeated as necessary to apply multiple Image Scaling Factors to the same element of Training Data. For example, The Data Augmentation Engine 340 may generate a plurality of Augmented Image Data 352, based on applying some or all of the Scale Factors 344a, 344b, . . . , and 344n to the same first Image Data 312a. Furthermore the process may be repeated recursively by further rescaling already Augmented Image Data. Advantageously, iteratively scaling Image Data to achieve a desired Image Scale may provide more accurate Augmented Image Data than may be achieved by directly scaling from an input Image Scale to a desired Image Scale in a single step.

The Scale Selective Training Engine 320 may determine a Desired Label 356 for the Augmented Image Data 352 based on the Augmented Image Scale 354 and a Scale Selective Specification 330. For example, the Desired Label 356 may be assigned an In-Scope label when the Augmented Image Scale 354 comprise an In-Scope Scale 332; or, may be assigned an Out-of-Scope label when the Image Scale 354 comprises an Out-of-Scope Scale 334. Embodiments of a Scale Selective Training Engine may assign a Desired Label 356 on a plurality of criteria, including but not limited-to, whether the Augmented Image Data 352 comprises an Object of Interest, and based on an Image Scale of the Object of Interest. The Augmented Image Data 352, Augmented Image Scale 354, and Desired Label 356 comprise an element of Scale Selective Training Data for use in training a Machine Learning System to support Scale Selective Image Classification Tasks. The process of generating a single element of Scale Selective Training Data 350 may be repeated for all elements of Training Data in the set of Training Data 310, to generate a set of Scale Selective Training Data. Furthermore, an element of Scale Selective Training Data may be provided as an input to the Data Augmentation Engine 340, for applying a further augmentation, such as a further re-scaling, to the Augmented Image Data 352. Embodiments as disclosed herein include providing the Scale Selective Training Data to a Machine Learning System, in real-time, during a Training Process of the Machine Learning System, advantageously removing the need to first store the Scale Selective Training Data prior to its input to the Machine Learning System. In an embodiment, a set of Scale Selective Training Data is generated and stored offline a priori to a Training Process for a Machine Learning System.

Figure 4:
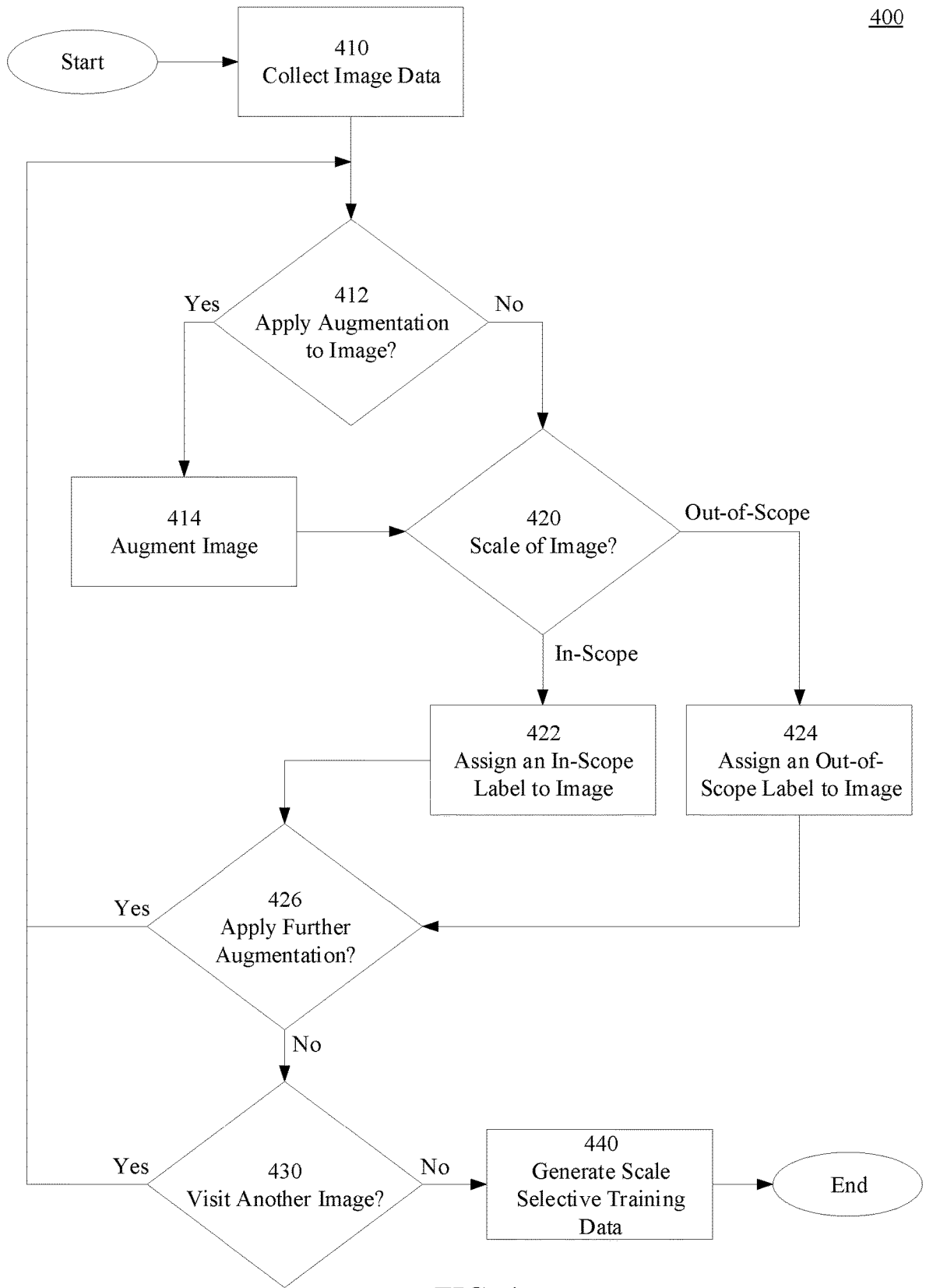
FIG. 4 is a flow chart of a method for generating Scale Selective Training Data using Data Augmentations in accordance with an embodiment of the present disclosure, for use in training a Machine Learning System to support Scale Selective Image Classification Tasks.

FIG. 4 illustrates a method 400 for generating Scale Selective Training Data in accordance with an embodiment of the present disclosure. The operation of method 400 is not intended to be limiting but rather illustrates an example of generating Scale Selective Training Data for use in a Training Process for a Machine Learning System. In some embodiments, method 400 may be accomplished with one or more additional operations not described, and/or without one or more of the operations described. Similarly, the order in which the operation of method 400 is illustrated and described below is not intended to be limiting, but rather illustrative of an example of generating Scale Selective Training Data in accordance with an embodiment of the present disclosure.

In some embodiments, the method 400 may be implemented in one or more processing devices (e.g., a digital processor, an analog processor, a digital circuit designed to process information, an analog circuit designed to process information, a computing network implemented in the cloud, a state machine, and/or other mechanisms for electronically processing information). The one or more processing devices may include one or more devices executing some or all of the operations of the method 400 in response to instructions stored electronically on an electronic storage medium. The one or more processing devices may include one or more devices configured through hardware, firmware, and/or software to be specifically designed for execution of one or more of the operations of the method 400.

The method 400 may include an operation 410 for collecting a set of Training Data comprising a plurality of images, each image comprising Image Data of an Object of Interest at an Image Scale of the Object of Interest. In an embodiment, the operation 410 may comprise using an image sensor to generate Image Data of an Object of Interest at different Image Scales based on varying a distance between the Image Sensor and the Object of Interest. In an embodiment, the operation 410 may retrieve a set of previously generated Training Data from a storage medium, wherein the Training Data comprises a plurality of Image Data of an Object of Interest at a variety of Image Scales. The Training Data collected by the operation 410 serves as a basis for generating a set of Scale Selective Training Data. In an embodiment, the set of Training Data may comprise a plurality of Image Data at the same or similar Image Scales. In an embodiment the Training Data comprises a plurality of Image Date of an Object of Interest, each having the same Image Scale. In an embodiment, the set of Training Data may comprise Image Data of an Object of Interest collected at a maximum desired Image Scale. In such an embodiment, a subsequent step of Data Augmentation, such as operation 414, may resize Image Data based on down-sampling only, advantageously eliminating the need to up-sample and create new data when upscaling a size of Image Data, thereby improving computational efficiencies in creating Scale Selective Training Data.

The method 400 may include an operation 412, for assessing whether to augment an image from the set of Training Data. For example, if the set of Training Data comprises a limited amount of images or lacks variation in the Image Scale of the Object of Interest, it may be desirable to generate new Augmented Images to support a more robust set of Scale Selective Training Data. The method 400 may proceed to a further operation based on the outcome of the operation 412. For example, the method 400 may proceed to an operation 414 for augmenting an element of Training Data. Data Augmentations may include, but are not limited to: scaling Image Data, spatially translating Image Data, other transforms to Image Data including rotation, zoom, background manipulation, random noise injection, mirroring, or color adjustments. The method 400 may also skip the operation of data augmentation and instead proceed to an operation 420 for determining an Image Scale of the Image Data.

The method 400 may include an operation 420 for determining the Image Scale of an Object of Interest. For example, the operation 420 may determine whether an element of Training Data (e.g. an image) comprises Image Data of an Object of Interest at a particular Image Scale. The Image Data may comprise, for example, original Image Data collected via an operation 410, or may comprise Augmented Image Data generated via the operation 414. The operation 420 may comprise determining whether the Image Scale of the Object of Interest, whether augmented or not, is an In-Scope Scale or an Out-of-Scope Scale. In an embodiment, a Scale Selective Specification may define a set of Image Scales and corresponding labels for use in determining a Desired Label for the Image Data. In an embodiment, the Scale Selective Specification comprises a set of In-Scope Scales and a set of Out-of-Scope Scales.

The method 400 may proceed to a further operation based on the outcome of the operation 420. For example, if the outcome of the operation 420 is an In-Scope determination, the method 400 may proceed to an operation 422 to assign an In-Scope Label to the Image Data; or, if the outcome of the operation 420 is an Out-of-Scope determination, then the method 400 may proceed to an operation 424 to assign an Out-of-Scope label to the Image Data. The outcome of either operations 422 or 424 is an element of Scale Selective Training Data comprising Image Data or Augmented Image Data at a particular Image Scale or Augmented Image Scale, respectively, and a corresponding Desired Label based on the Image Scale or Augmented Image Scale.

The method 400 may include an operation 426 for determining whether to apply further Data Augmentation(s) to an element of Scale Selective Training Data. Accordingly, the method 400 may proceed to an operation 412 and proceed with applying a further Data Augmentation to the element of Scale Selective Training Data in consideration of generating multiple elements of Scale Selective Training Data of the same Image Data but with different Data Augmentations, such as with different Augmented Image Scales; or, the method 400 may proceed to an operation 430 for determining whether to visit a further image from the set of Training Data. Advantageously, iteratively scaling Image Data to achieve a desired Image Scale may provide more accurate Augmented Image Data than may be achieved by directly scaling from an input Image Scale to a desired Image Scale in a single step.

The method 400 may include an operation 430 for visiting a further image of the set of Training Data, and repeating operations of the method 400 to assign a Desired Label to the corresponding Image and Image Data. Accordingly, operations in accordance with the method 400 may be repeated as necessary to generate a plurality of Scale Selective Training Data elements. In the event there is no need to visit further images or no further images to visit, the method 400 may advance to an operation 440 to collate some or all elements of Scale Selective Training Data into a set of Scale Selective Training Data, for use in training a Machine Learning System to support Scale Selective Image Classification tasks.

Figure 5:
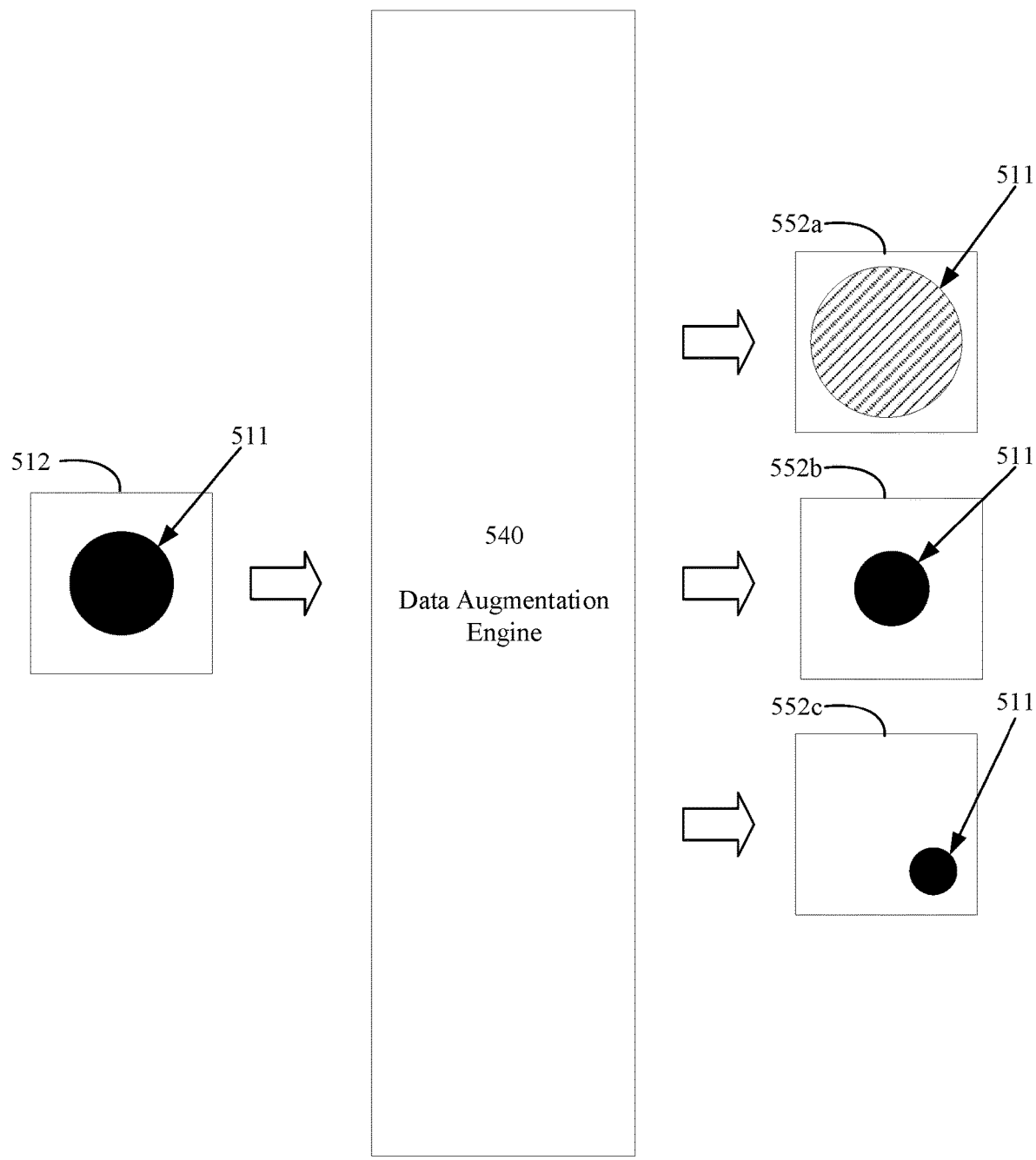
FIG. 5 is an illustrative example of applying Data Augmentations to Image Data in accordance with an embodiment of the present disclosure.

FIG. 5 depicts an illustrative example of applying Data Augmentations to an element of Training Data in accordance with an embodiment of the present disclosure. FIG. 5 illustrates an input Image Data 512 comprising an Object of Interest 511, namely a circle with a solid fill pattern at an input Image Scale. A Data Augmentation Engine 540 in accordance with an embodiment of the present disclosure, receives the input Image Data 512 and applies Data Augmentations to the input Image Data 512, to generate Augmented Image Data. For example, the Data Augmentation Engine 540 may generate first, second, and third Augmented Image Data 522a, 522b, and 522c, respectively, each Augmented Image Data generated based on applying Data Augmentations to the input Image Data 512. In particular, the Data Augmentation Engine 540 generates the first Augmented Image Data 522a based on applying a first Image Scale Factor to resize the input Image Data 512 to a larger Image Scale, and applies a further Data Augmentation to depict the Object of Interest with a striped line pattern. Similarly, the Data Augmentation Engine 540 generates the second Augmented Image Data 522b based on applying a second Image Scale Factor to resize the input Image Data 512 to a smaller Image Scale; and, generates the third Augmented Image Data 522c based on applying a third Image Scale Factor to resize the input Image Data 512 to a smaller Image Scale, and applies a further Data Augmentation to translate a position of the Object of Interest to a different spatial location.

Figure 6:
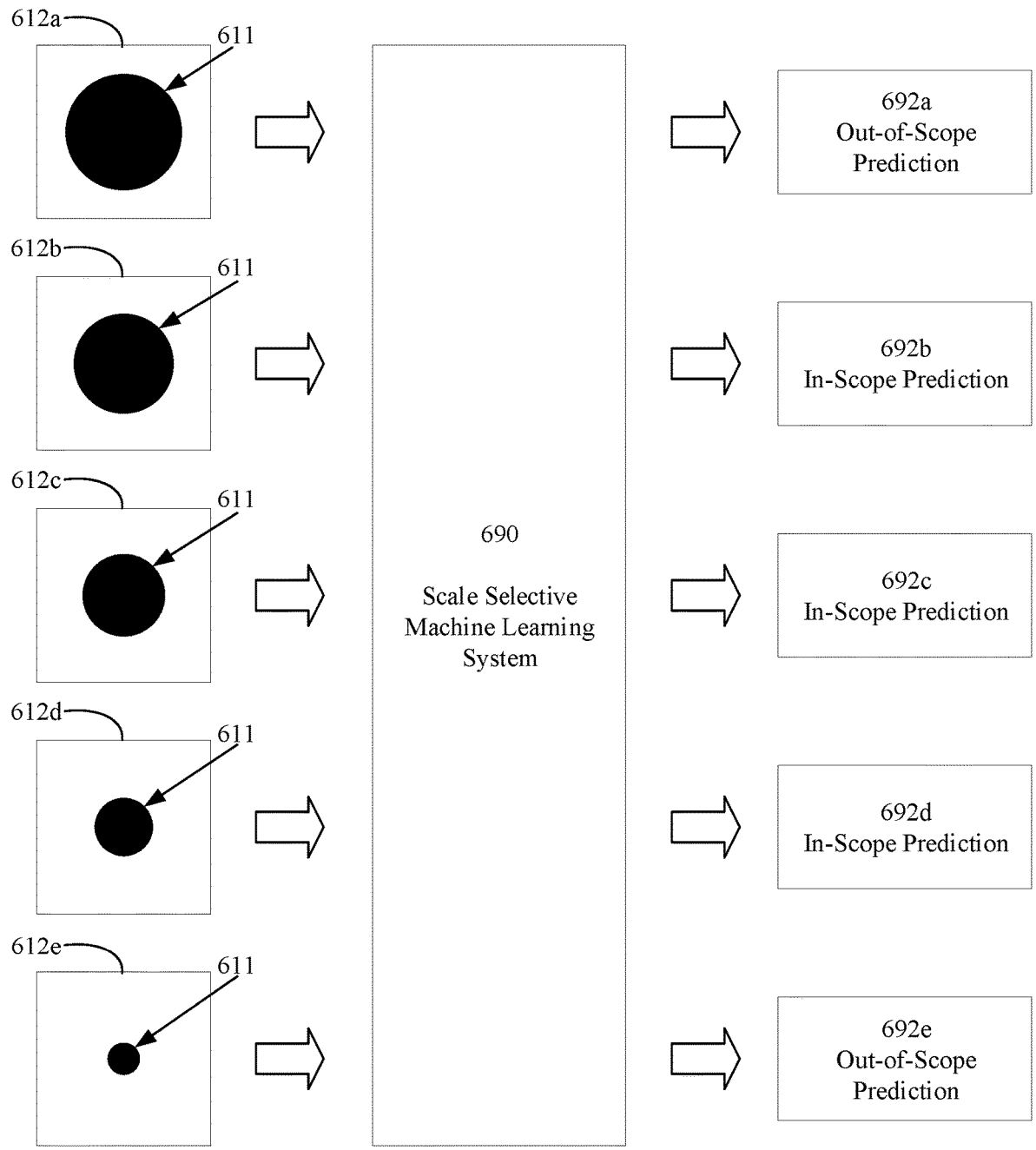
FIG. 6 is an illustrative example of a Machine Learning System trained for Scale Selective Image Classification Tasks.

FIG. 6 depicts an illustrative example of a Machine Learning System trained to support Scale Selective Image Classification Tasks in accordance with an embodiment of the present disclosure. FIG. 6 illustrates a plurality of Image Data 612a, 612b, 612c, 612d, and 612e of an Object of Interest 611, namely a circle with a solid fill pattern, a different Image Scales. The Machine Learning System 690 is trained to predict whether an Object of Interest is In-Scope or Out-of-Scope. For example, the Machine Learning System 690 may be trained to identify Objects of Interest having an In-Scope Image Scale or an Out-of-Scope Image Scale as may be defined in a Scale Selective Specification. In an embodiment, the Scale Selective Specification may define a single discrete In-Scope Scale. In an embodiment, the Scale Selective Specification may define a continuous range of In-Scope Scales. Accordingly, the Machine Learning System 690 receives the plurality of Image Data 612a, 612b, 612c, 612d, and 612e and generates a corresponding plurality of Predictions 692a, 692b, 692c, 692d, and 692e, respectively based on an Image Scale of the Object of Interest 611. In accordance with an embodiment of a Scale Selective Training Process, the Machine Learning System 690 is trained to predict that the first and fifth Image Data 612a and 612e, respectively, comprise Out-of-Scope Image Scales and outputs Out-of-Scope predictions 692a and 692e, respectively. Thus, while the Machine Learning System may identify that the Image Data comprises an Object of Interest for an In-Scope class of objects, the Machine Learning System nevertheless outputs an Out-of-Scope prediction because the Object of Interest is too large (e.g. first Image Data 612a) or too small (e.g. fifth Image Data 612e) or otherwise comprises an Image Scale defined as an Out-of-Scope Image Scale. Conversely, the Machine Learning System 690 is trained to predict that the second, third, and fourth Image Data 612b, 612c, and 612d, respectively, comprise In-Scope Image Scales and outputs In-Scope predictions 692b, 692c, and 692d, respectively.

Figure 7:
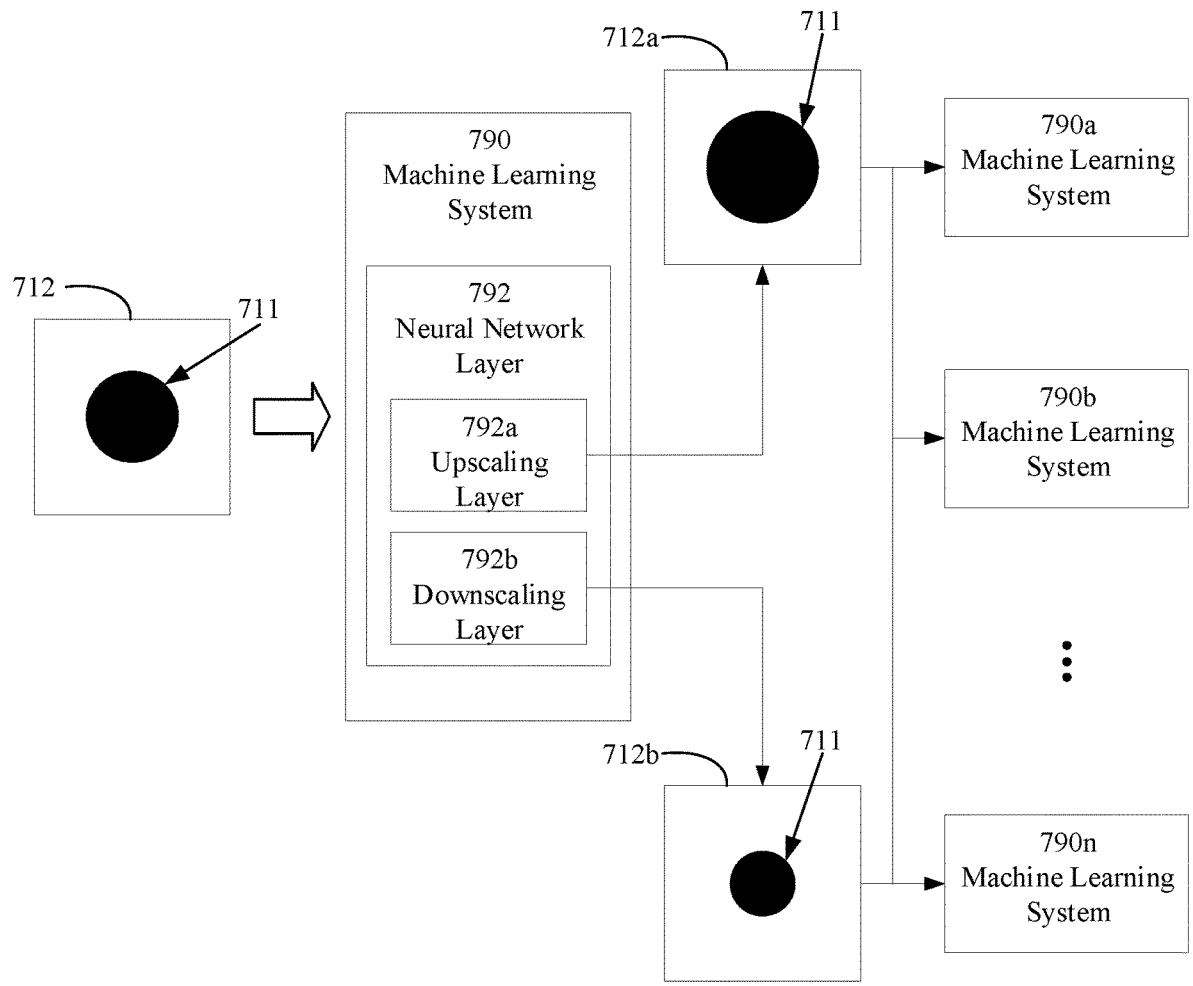
FIG. 7 is a block diagram of a Machine Learning System reconfigured to provide scaled Image Data as input to a plurality of Machine Learning Systems in parallel trained on a fixed known Image Scale of an Object of Interest.

Embodiments of a Machine Learning System as disclosed herein may comprise a conventional Machine Learning System architecture, wherein architectural features are re-configured in the absence of a Scale Selective Training Process to support Scale Selective Image Classifications. As illustrated in FIG. 7, for example, the Machine Learning System 790 may comprise a neural network having a plurality of layers, wherein a first neural network layer 792 comprises a set of parallel Upscaling and/or Downscaling layers, in particular an Upscaling layer 792a and a Downscaling layer 792b. Each layer performs a corresponding Upscaling or Downscaling of an Input Data based on a set Image Scaling Factor, to generate an element of Augmented Input Data, resized to a different Image Scale. For example, the Machine Learning System 790 may receive an input Image Data 712 comprising an Object of Interest 711, namely a circle having a solid fill pattern, at an input Image Scale. The Image Data 712 may be provided to each of the Upscaling layer 792a and the Downscaling layer 792b, which each respectively apply a set Image Scaling Factor for Upscaling and Downscaling, respectively, resulting in a first Augmented Image Data 712a comprising the Object of Interest 711 at an Upscaled Image Scale and, a second Augmented Image Data 712b comprising the Object of Interest 711 at a Downscaled Image Scale. The resulting Upscaled and Downscaled Images 712a and 712b, respectively, are each provided as an input to a plurality of Machine Learning Systems in parallel, for example first, second, and $n^{th}$ Machine Learning Systems 790a, 790b, . . . , and 790n in parallel. Each of the Machine Learning Systems 790a, 790b, . . . , and 790n are trained on a set of Training Data comprising the Object of Interest 711 at a fixed known Image Scale. Accordingly, using the predictions of the parallel Machine Learning Systems, and the known Image Scaling Factor of each parallel branch, a Scale Selective Image Classification Task may be supported. In an embodiment, the outputs of the Upscaling and Downscaling layers may be merged spatially, or using other merging techniques, to supply a single Image Data to each Machine Learning System that comprises both copies of the Augmented Image Data 712a and 712, wherein an output prediction of the parallel Machine Learning Systems 790a, 790b, . . . , and 790n are encoded with a spatial location.

Figure 8:
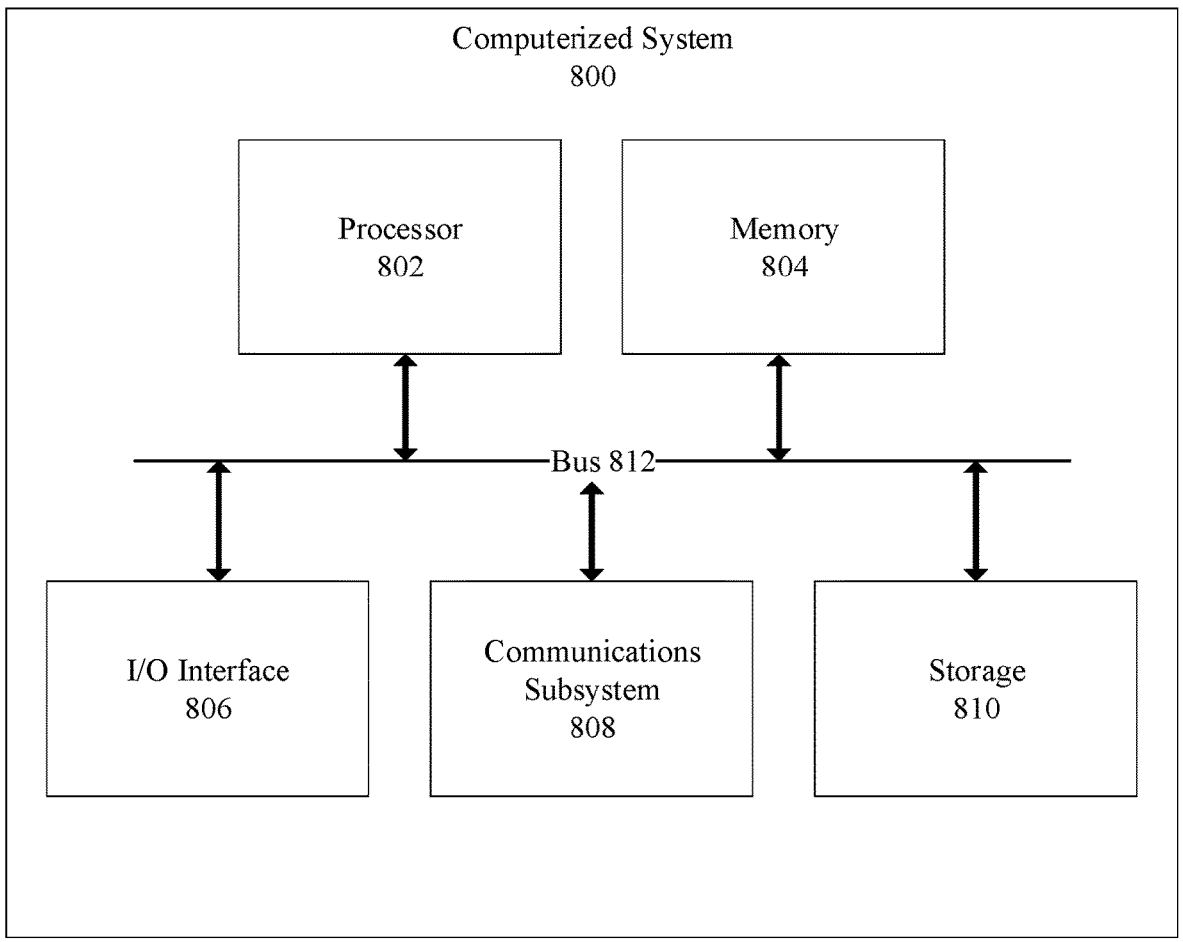
FIG. 8 is a block diagram of an example computing device or system for implementing Scale Selective Machine Learning Systems and methods in accordance with the present disclosure.

FIG. 8 is a block diagram of an example computerized device or system 800 that may be used in implementing one or more aspects or components of an embodiment of a system and method for training and/or implementing a Machine Learning System which supports Scale Selective Image Classification Tasks in accordance with the present disclosure, for example implementing one or more operations as described in relation to the methods 100 and/or 300; and/or, for example, for use in implementing various aspects of an image sensor, Training Data, Scale Selective Training Engines, Scale Selective Specifications, Scale Selective Training Data, Data Augmentation Engines, Machine Learning Systems, and/or other features, components, and subcomponents of Scale Selective systems and methods as disclosed herein.

Computerized system 800 may include one or more of a processor 802, memory 804, a mass storage device 810, an input/output (I/O) interface 806, and a communications subsystem 808. Further, system 800 may comprise multiples, for example multiple processors 802, and/or multiple memories 804, etc. Processor 802 may comprise one or more of a digital processor, an analog processor, a digital circuit designed to process information, an analog circuit designed to process information, a state machine, and/or other mechanisms for electronically processing information. These processing units may be physically located within the same device, or the processor 802 may represent processing functionality of a plurality of devices operating in coordination. The processor 802 may be configured to execute modules by software; hardware; firmware; some combination of software, hardware, and/or firmware; and/or other mechanisms for configuring processing capabilities on the processor 802, or to otherwise perform the functionality attributed to the module and may include one or more physical processors during execution of processor readable instructions, the processor readable instructions, circuitry, hardware, storage media, or any other components.

One or more of the components or subsystems of computerized system 800 may be interconnected by way of one or more buses 812 or in any other suitable manner.

The bus 812 may be one or more of any type of several bus architectures including a memory bus, storage bus, memory controller bus, peripheral bus, or the like. The CPU 802 may comprise any type of electronic data processor. The memory 804 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 810 may comprise any type of storage device configured to store data, programs, and other information and to make the data, programs, and other information accessible via the bus 812. The mass storage device 810 may comprise one or more of a solid state drive, hard disk drive, a magnetic disk drive, an optical disk drive, or the like. In some embodiments, data, programs, or other information may be stored remotely, for example in the cloud. Computerized system 800 may send or receive information to the remote storage in any suitable way, including via communications subsystem 808 over a network or other data communication medium.

The I/O interface 806 may provide interfaces for enabling wired and/or wireless communications between computerized system 800 and one or more other devices or systems. For instance, I/O interface 806 may be used to communicatively couple with sensors, such as cameras or video cameras. Furthermore, additional or fewer interfaces may be utilized. For example, one or more serial interfaces such as Universal Serial Bus (USB) (not shown) may be provided.

Computerized system 800 may be used to configure, operate, control, monitor, sense, and/or adjust devices, systems, and/or methods according to the present disclosure.

A communications subsystem 808 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 808 may include any component or collection of components for enabling communications over one or more wired and wireless interfaces. These interfaces may include but are not limited to USB, Ethernet (e.g., IEEE 802.3), high-definition multimedia interface (HDMI), Firewire™ (e.g., IEEE 1394), Thunderbolt™, WiFi™ (e.g., IEEE 802.11), WiMAX (e.g., IEEE 802.16), Bluetooth™, or Near-field communications (NFC), as well as GPRS, UMTS, LTE, LTE-A, and dedicated short range communication (DSRC). Communication subsystem 808 may include one or more ports or other components (not shown) for one or more wired connections. Additionally or alternatively, communication subsystem 808 may include one or more transmitters, receivers, and/or antenna elements (none of which are shown).

Computerized system 800 of FIG. 8 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of generating scale selective training data for use in training a machine learning system to support scale selective image classification tasks, comprising:
   obtaining a plurality of images comprising an object of interest at a plurality of image scales;
   assigning a desired label to each of the plurality of images based on an image scale of the object of interest in the each image, wherein the desired label comprises an in-scope response when the image scale comprises an in-scope image scale, and
   generating a set of training data for use in training the machine learning system to predict a scale of the object of interest, the training data comprising the plurality of images and corresponding desired labels.

2. The method of claim 1, wherein the desired label comprises an out-of-scope response when the image scale comprises an out-of-scope image scale.

3. The method of claim 1, wherein obtaining the plurality of images comprises use of an image sensor to capture the object of interest at different image scales based on varying a distance between the image sensor and the object of interest.

4. The method of claim 1, wherein obtaining the plurality of images comprises:
   obtaining a first plurality of images of the object of interest at first image scales, and
   generating a second plurality of images based on re-scaling the first plurality of images to second image scales.

5. The method of claim 4, wherein the first plurality of images comprise a first image of the object of interest at a maximum image scale, wherein generating the second plurality of images comprises down-sampling the first image.

6. The method of claim 4, wherein obtaining the plurality of images comprises: generating a third plurality of images based on re-scaling the second plurality of images to third image scales.

7. The method of claim 1, wherein the plurality of image data comprises the set of training data generated for use in training the machine learning system.

8. The method of claim 1, further comprising generating the set of training data directly to the machine learning system contemporaneously with its generation.

9. A method of generating a prediction in a scale selective machine learning system, comprising:
   receiving an input comprising image data of an object;
   determining a scale of the object,
   generating a prediction for the object based on the scale of the object; and
   wherein the prediction comprises a label, the method further comprising selecting the label from a set of labels comprising an in-scope label and an out-of-scope label, and selecting the in-scope label when the scale of the object comprises an in-scope scale;
   wherein the in-scope scale comprises a continuous range of in-scope scales, or comprises a discrete in-scope scale.

10. The method of claim 9, further comprising:
   determining a class of the object;
   wherein generating the prediction for the object is further based on the class of the object.

11. The method of claim 10, further comprising selecting the in-scope label when a scale of the object comprises an in-scope scale and a class of the object comprises an in-scope class.

12. The method of claim 10, further comprising selecting the out-of-scope label when at least one of a scale of the object does not comprise an in-scope scale or a class of the object does not comprise an in-scope class.

* * * * *